United States Patent
Huang

[11] Patent Number: 5,940,147
[45] Date of Patent: Aug. 17, 1999

[54] POWER SUPPLY SYNCHRONIZATION

[75] Inventor: Kin-Chuan Huang, Chungli, Taiwan

[73] Assignee: U.S. Philips Corporation, New York, N.Y.

[21] Appl. No.: 08/776,562

[22] PCT Filed: Jun. 1, 1995

[86] PCT No.: PCT/IR95/00422

§ 371 Date: Jan. 31, 1997

§ 102(e) Date: Jan. 31, 1997

[87] PCT Pub. No.: WO96/38977

PCT Pub. Date: Dec. 5, 1996

[51] Int. Cl.$^6$ .............................. H04N 5/63; H04N 5/05
[52] U.S. Cl. ...................... 348/730; 348/500; 345/211
[58] Field of Search .................... 348/730, 500; 315/411; 363/21, 97; 345/211, 212, 213; H04N 5/63, 3/18, 5/05

[56] References Cited

U.S. PATENT DOCUMENTS

| | | | |
|---|---|---|---|
| 3,916,402 | 10/1975 | Hornung | 340/324 |
| 4,079,418 | 3/1978 | Kupka et al. | 358/149 |
| 4,368,409 | 1/1983 | Sivanesan et al. | 315/411 |
| 4,516,169 | 5/1985 | Truskalo | 348/730 |
| 4,808,906 | 2/1989 | Liepe | 348/730 |
| 4,866,525 | 9/1989 | Rodriguez-Cavazos et al. | 358/190 |
| 4,987,525 | 1/1991 | Rilly et al. | 363/21 |
| 5,013,980 | 5/1991 | Stephens et al. | 315/411 |
| 5,029,269 | 7/1991 | Elliott et al. | 363/21 |
| 5,089,947 | 2/1992 | Driscoll et al. | 348/730 |
| 5,132,891 | 7/1992 | Kobayashi et al. | 348/730 |
| 5,161,241 | 11/1992 | Kanai | 363/21 |
| 5,304,898 | 4/1994 | Kataoka et al. | 348/730 |
| 5,331,354 | 7/1994 | Koyama et al. | 348/730 |
| 5,402,330 | 3/1995 | Megeid | 348/730 |
| 5,414,475 | 5/1995 | Trzyna et al. | 348/730 |
| 5,422,589 | 6/1995 | Shyi-Hon | 348/730 |
| 5,659,371 | 8/1997 | Krause | 348/730 |

*Primary Examiner*—John K. Peng
*Assistant Examiner*—Jean W. Désir
*Attorney, Agent, or Firm*—Edward W. Goodman

[57] ABSTRACT

A power supply (1, 2) is synchronized to a repetition frequency of an addressing of lines in a multiples rate line addressing circuit (7). The power supply (1, 2) operates satisfactorily if switched within a prescribed frequency range. The switching frequency of the power supply (1, 2) is equal to the repetition frequency divided by an integer larger than zero. The integer is determined such that the switching frequency of the power supply (1, 2) occurs within the prescribed frequency range for all repetition frequencies of the addressing of the lines.

11 Claims, 2 Drawing Sheets

POWER SUPPLY SYNCHRONIZATION

BACKGROUND OF THE INVENTION

1. Field of the Invention

The invention relates to a method of, device for, and a control circuit for synchronizing a power supply to a line addressing repetition frequency of a line addressing circuit, the method comprising the steps of: generating trigger moments having a trigger repetition frequency equal to the line addressing repetition frequency, determining an integer larger than zero in dependence upon the trigger repetition frequency, and generating control moments in response to the trigger moments for determining a switching frequency of the power supply, the control moments having a repetition frequency being the trigger repetition frequency divided by the integer.

Such a method and a control circuit for synchronizing a power supply may be applicable in a display system comprising a picture display device and a multiple rate scanning circuit suitable for displaying pictures with different scan rates, as is the case in computer monitors. The power supply may be used to supply stabilized voltages to other circuits of the display system, or to generate an anode voltage for the picture display device.

2. Description of the Related Art

Such a synchronized power supply for a multiple scanning frequency video monitor is known from U.S. Pat. No. 4,516,169. The known display system includes a horizontal deflection circuit which can be operated on two selectable horizontal deflection frequencies. A switching power supply is switched on one optimal switching frequency synchronized to the selected horizontal deflection frequency, independent on which of the two horizontal deflection frequencies occurs. Synchronized operation of the switching supply is desirable to prevent switching of components in the switching power supply from becoming visible on a picture tube of the display system. The known display system shows an embodiment able to cope with two different horizontal deflection frequencies: a second horizontal frequency of 31.5 kilohertz is a first horizontal frequency of 15.75 kilohertz multiplied by two. The switching supply is operated on the first horizontal frequency of 15.75 kilohertz for both horizontal deflection frequencies. A drawback of the known display system is that a fixed switching frequency of the switching supply synchronized to the two horizontal deflection frequencies is only possible if each of the horizontal deflection frequencies is an integer multiple of the fixed switching frequency. The known display system does not offer a practical solution if the display system should be capable of displaying horizontal deflection frequencies which are not an integer multiple of one fixed frequency suitable for switching a switching supply. This can be the case in computer monitors in which the horizontal deflection frequencies, for example, can be 35.2, 37.8, 48, 56, 64, 77.1 or 81.1 kilohertz, respectively.

SUMMARY OF THE INVENTION

It is an object of the invention to switch a switching supply synchronized to a line addressing frequency having a value within a large range of various line addressing frequencies without imposing conditions on the line addressing frequencies.

A first aspect in accordance with the invention is characterized in that the repetition frequency of the control moments can assume several values within a prescribed frequency range, and in that the step of determining the integer results in an integer for which it holds that a division of the trigger repetition frequency by the integer provides a repetition frequency of the control moments within this prescribed frequency range.

It is a second aspect of the invention to provide a display system comprising a picture display device for displaying picture information, a multiple rate line addressing circuit for generating the line addressing of the picture display device having a line addressing repetition frequency, and for generating a trigger signal having a trigger repetition frequency equal to the line addressing repetition frequency, a synchronized power supply for generating a supply voltage, means for determining an integer larger than zero in dependence upon the trigger repetition frequency, and means for generating a control signal for determining a switching frequency of the power supply in response to the trigger signal, the control signal having a repetition frequency being the trigger frequency divided by the integer, characterized in that the repetition frequency of the control signal can assume several values within a prescribed frequency range, and in that the means for determining the integer is adapted to generate an integer for which it holds that a division of the trigger repetition frequency by the integer provides a repetition frequency of the control moments within this prescribed frequency range.

It is a third aspect of the invention to provide a control circuit for synchronizing a power supply to a trigger signal having a trigger frequency equal to a line addressing repetition frequency of a line addressing circuit, the control circuit comprising means for determining an integer larger than zero in dependence upon the trigger frequency, and means for generating a control signal for determining a switching frequency of the power supply in response to the trigger signal, the control signal having a repetition frequency being the trigger frequency divided by the integer, characterized in that the repetition frequency of the control signal can assume several values within a prescribed frequency range, the means for determining the integer being adapted to generate an integer for which it holds that a division of the trigger repetition frequency by the integer provides a repetition frequency of the control moments within this prescribed frequency range.

It is a fourth aspect of the invention to provide a device for synchronizing a power supply to a line addressing repetition frequency of a line addressing circuit comprising means for generating trigger moments having a trigger repetition frequency equal to the line addressing repetition frequency, means for determining an integer larger than zero in dependence upon the trigger repetition frequency, and means for generating control moments in response to the trigger moments for determining a switching frequency of the power supply, the control moments having a repetition frequency being the trigger repetition frequency divided by the integer, characterized in that the repetition frequency of the control moments can assume several values within a prescribed frequency range, and in that the means for determining the integer results in an integer for which it holds that a division of the trigger repetition frequency by the integer provides a repetition frequency of the control moments within this prescribed frequency range.

A display system comprises a picture display device, a multiple rate line addressing circuit for displaying pictures with different scan rates, and a switching power supply. The line addressing circuit causes scanning of lines of positions on the picture display device. The lines have a line addressing repetition frequency (further referred to as line frequency) related to the different scan rates. The line addressing circuit can be a line deflection circuit as used to scan a conventional picture tube, or row/dot-selection circuitry as used in matrix displays. Trigger moments are generated having a trigger repetition frequency equal to the line frequency. A switching frequency of the power supply is determined by control moments having a repetition frequency being the repetition frequency of the trigger moments divided by an integer larger than zero. The integer is determined such that the repetition frequency of the control moments occurs within a prescribed frequency range. In this way, the power supply is operated synchronized to the trigger moments and at a frequency lying within the prescribed frequency range. The power supply is designed such that it operates without problems within the prescribed range of switching frequencies.

If hardware circuits are used to generate the trigger and control moments, these moments could be linked to moments on which a signal changes level. If a micro computer generated the trigger and control moments, this could as well be signals changing level as values representing a certain moment.

In an embodiment of a method in accordance with the invention, which is characterized in that the step of determining the integer is adapted to cause the integer to be equal to one for all trigger repetition frequencies within the prescribed frequency range, the integer is generated to be one if the line frequency occurs within the prescribed frequency range of power supply switching frequencies. In this case a first advantage is that the switching frequency of the power supply is equal to the line frequency and thus switching of components of the power supply occurs only one time during each line period. If the switching frequency of the power supply were an integer multiple of the line frequency this would cause the disturbances to occur more often on the display device. This is especially the case if the power supply is used to generate an anode voltage of a picture tube. A second advantage is that the line frequency is not divided by an integer larger than one if this would result in a switching frequency of the power supply still occurring within the prescribed frequency range. As an example, if the prescribed frequency range includes frequencies from 15 kHz up to 60 kHz, and the line frequency is 45 kHz, the power supply will be switched on 45 kHz and not on 30 kHz or 15 kHz. In this way the power supply will operate as efficient as possible and will generate as stable output voltages as possible.

In an embodiment of a method in accordance with the invention, which is characterized in that the step of determining the integer is adapted to generate the integer having a value causing the repetition frequency of the control signal to be as close as possible to a highest frequency within the prescribed frequency range but not being higher than the highest frequency, if the trigger repetition frequency is higher than the highest frequency, the line frequency is higher than a highest frequency within the prescribed frequency range. The integer is generated to obtain an as high as possible switching frequency of the power supply occurring within the prescribed frequency range. This has the advantage that the power supply will operate as efficient as possible and will generate as stable output voltages as possible.

A preferred embodiment of a method in accordance with the invention is characterized that the step of determining the integer comprises the steps of: generating a disable period with a certain duration in response to the trigger signal, and generating a control signal in response to the trigger signal if this trigger signal does not occur during a preceding disable period, wherein the certain duration corresponds to the highest frequency. If the trigger moments do not occur during an active preceding disable period, the trigger moments generate a disable period with a certain duration and the trigger moments generate related control moments for switching the power supply. The certain duration corresponds to the highest frequency within the prescribed frequency range. If trigger moments have a repetition frequency within the prescribed frequency range, every trigger moment will trigger a disable period and the disable period will be inactive before a next trigger moment occurs. At every trigger moment, a control moment is generated to obtain a switching frequency of the power supply equal to the line frequency. If the trigger moments have a repetition frequency higher than the highest frequency within the prescribed frequency range, it will last until the first trigger moment occurring after the certain duration of a disable period to trigger a next disable period and a next control moment. In this way, the switching frequency of the power supply occurs within the prescribed frequency range and is as high as possible.

A preferred embodiment of a display system in accordance with the invention, is characterized in that the means for determining the integer comprises a non-retriggerable multivibrator having an input coupled to receive the trigger signal and an output coupled to supply the control signal, the trigger signal causes the multivibrator to change to a disable state having a certain duration if the trigger signal does not occur during a preceding disable state, and the output stays in the disable state if the trigger signal occurs during this disable state. A non-retriggerable multivibrator is triggered by a trigger signal to change into a disable state with a certain duration. A trigger moment, which is a trigger signal, has no effect if the multivibrator is in the disable state. An output of the multivibrator generates a signal indicating the disable state. The control moment which is a control signal is, or is related to, this output signal. The certain duration again corresponds to the highest frequency within the prescribed frequency range. If a trigger signal has a repetition frequency within the prescribed frequency range, every trigger signal will trigger a disable period and the disable period will be inactive before a next trigger signal occurs. At every trigger signal, a control signal is generated. If the trigger signal has a repetition frequency higher than the highest frequency within the prescribed frequency range, it will last until the first trigger signal occurring after the certain duration to trigger a next disable period and a next control signal.

BRIEF DESCRIPTION OF THE DRAWINGS

The foregoing and other aspects of the invention are described in more detail, by way of example, with reference to the accompanying drawings, in which.

DESCRIPTION OF THE PREFERRED EMBODIMENT

Figure 1:
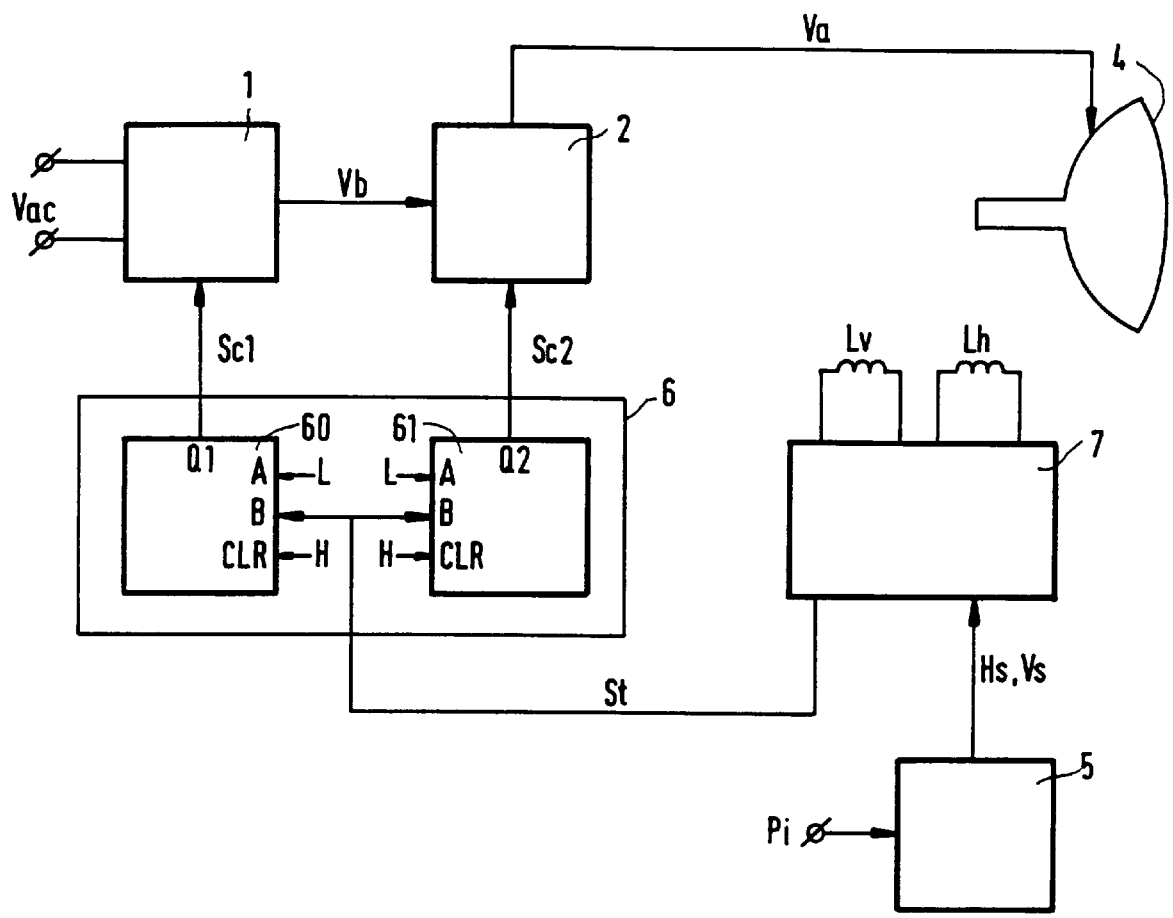
FIG. 1 shows an embodiment of a display system according to the invention.

FIG. 1 shows an embodiment of a display system according to the invention. A synchronization circuit 5 receives a picture signal Pi and supplies line and frame synchronizing signals Hs, Vs to an addressing circuit 7. The addressing circuit 7 comprises a line addressing circuit for generating a line deflection current through a line deflection coil Lh in response to the line synchronizing signal Hs, and a frame addressing circuit for generating a frame deflection current through a frame deflection coil Lv in response to the frame synchronizing signal Vs. The line addressing circuit generates a trigger signal St having a repetition frequency equal to a repetition frequency of the line deflection current or equal to the repetition frequency of the line synchronizing signal Hs. A first power supply 1 receives a non stabilized input voltage Vac (for example, an AC line voltage) and supplies a stabilized output voltage Vb to a second power supply 2 which is an EHT-supply for supplying an anode voltage Va to a picture tube 4. The first power supply 1 and the EHT-supply 2 are controlled by control signals Sc1 and Sc2, respectively. The control signals Sc1, Sc2 determine a switching frequency of the respective supplies 1, 2. A control circuit 6 receives the trigger signal St, and supplies the control signals Sc1, Sc2. The control circuit 6 comprises two non-retriggerable monostable multivibrators (for example, the MM74HC221A of National Semiconductors) 60, 61. Both multivibrators 60, 61 have a negative transition triggered input A connected to a low level L, a positive transition triggered input B to receive the trigger signal St, and a clear input CLR connected to a high level H. The first multivibrator 60 has an output Q1 which supplies the first control signal Sc1. The second multivibrator 61 has an output Q2 which supplies the second control signal Sc2. A positive going edge of the trigger signal St causes the multivibrators 60, 61 to assume a disable state during a disable period. Each of the disable periods has a duration corresponding to a highest frequency on which the corresponding supply 1, 2 is allowed to operate. As both multivibrators 60, 61 operate in the same way the operation of only the first multivibrator 60 is elucidated. The trigger signal St occurring during a disable period has no effect as the first multivibrator 60 is non-retriggerable. The output signal Q1 is active high during the disable period. The rising edge of the output signal Q1 contains the repetition frequency information for controlling the first power supply 1.

The operation of the multivibrator 60 is further elucidated with reference to FIGS. 2a–2d. For example, the highest switching frequency of the first power supply 1 is chosen to be 60 kHz, so that the duration of the disable period Td needs to be 16.7 µs. FIGS. 2a, 2b, 2c, and 2d show the operation of the multivibrator 60 at a trigger signal St with repetition frequencies of 15 kHz, 50 kHz, 70 kHz, and 200 kHz, respectively. Only the relevant active moment of the trigger signal St is shown. The control signal Sc, determining the switching frequency of the first power supply 1, is related to the rising edge of the output signal Q1.

Figure 2A:
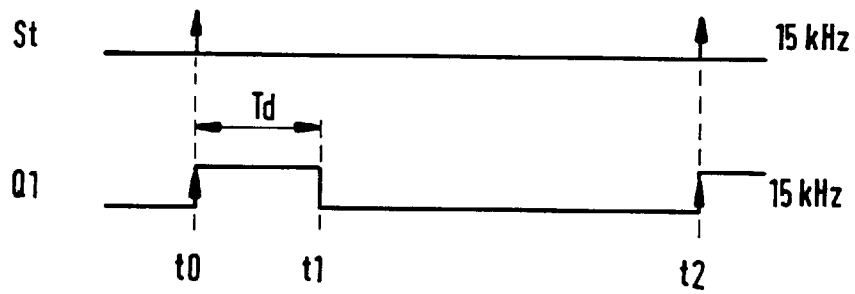
FIGS. 2a–2d show some signals to explain the operation of a control circuit according to the invention as shown in FIG. 1.
Figure 2B:
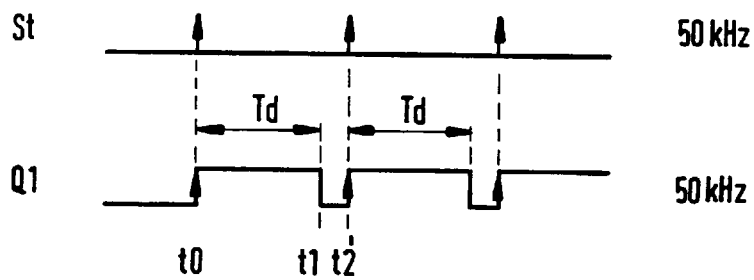

In FIGS. 2a and 2b, an active trigger signal St at moment t0 triggers the multivibrator 60 into the disable state in which the output signal Q1 has a high level during the disable period Td until moment t1. As the next trigger signal St occurs at a moment t2,t2' after moment t1 (the trigger signal St has a repetition frequency within the prescribed frequency range), each trigger signal St will trigger a disable period. At every trigger of a disable period, a control signal Sc is generated to obtain a switching frequency of the first power supply 1 equal to the line frequency, in this example being 15 kHz and 50 kHz, respectively.

Figure 2C:
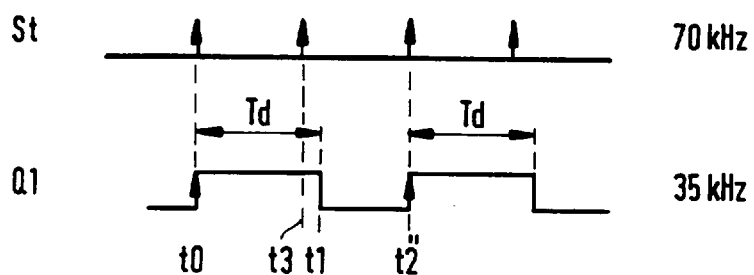
Figure 2D:
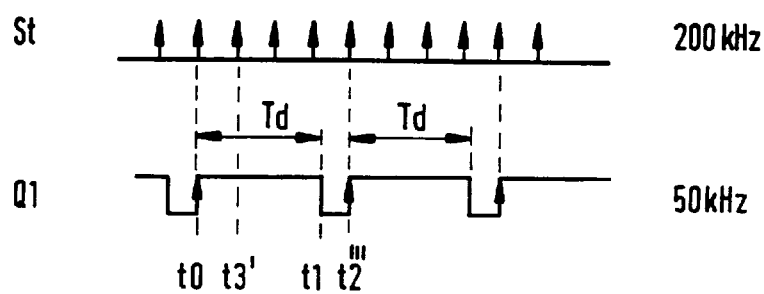

Also in FIGS. 2c and 2d, an active trigger signal St at moment t0 triggers the multivibrator 60 into the disable state in which the output signal Q1 has a high level during the disable period Td until moment t1. All trigger signals St occurring before moment t1 are ignored. The first trigger signal St occurring after moment t1 on moments t2" and t2'" triggers a next disable state. So, if the trigger signal St has a repetition frequency higher than the highest frequency (60 kHz) within the prescribed frequency range, the first trigger signal St occurring after the certain duration of a disable period will trigger a next disable period and a next control signal Sc. In this way, the switching frequency of the first power supply 1 occurs within the prescribed frequency range, is equal to the repetition frequency of the trigger signal divided by an integer larger than one, and is as high as possible but not higher than the highest frequency within the prescribed frequency range.

It will be evident that variations of the embodiment described above are possible within the scope of the invention. Although the embodiment shows two synchronized power supplies 1, 2 each synchronized by their own control signal Sc1, Sc2 it is also possible to synchronize both power supplies 1, 2 with one control signal having a repetition frequency in a range suitable for both power supplies. It is also possible to synchronize only one power supply. Instead of driving a picture tube 4 with deflection currents, it is alternatively possible to drive a matrix display with row and column selection circuits. The control circuit 6 can alternatively be a microcomputer programmed in a suitable way. This microcomputer detects moments of occurrence of the trigger signal St and generates moments of occurrence of the control signal Sc. The microcomputer could also perform the functions of the synchronization circuit. Detected horizontal synchronization moments could be represented in values. Moments of occurrence of the control signal Sc are calculated based on these values. It is also possible that one of the power supplies 1, 2 is synchronized to the control signal Sc2, Sc1 or a signal related thereto of the other power supply 2, 1 instead of being synchronized to the trigger signal St. More specifically, the control signal Sc1 of the first power supply 1 (being a line voltage power supply) can be obtained by dividing via a multivibrator 60, a flyback pulse generated by the second power supply 2 (being the EHT supply). The multivibrators 60, 61 can be replaced by other circuits which divide the frequency in an appropriate manner.

A preferred embodiment of determining the integer according to the invention is summarized below.

The integer is one if the repetition frequency of the addressing of the lines occurs within a prescribed frequency range of the power supply.

The integer is determined such that the switching frequency of the power supply (1, 2) occurs within the prescribed frequency range as close as possible to a highest frequency within the prescribed frequency range, if the repetition frequency is higher than the highest frequency.

I claim:

1. A method of synchronizing a power supply to a line addressing repetition frequency of a line addressing circuit, the method comprising the steps:

generating trigger moments having a trigger repetition frequency equal to the line addressing repetition frequency;

determining an integer larger than zero in dependence upon the trigger repetition frequency; and generating control moments in response to the trigger moments for determining a switching frequency of the power supply, the control moments having a repetition frequency being the trigger repetition frequency divided by the integer, characterized in that the repetition frequency of the control moments is one of several values within a prescribed frequency range, and in that the step of determining the integer results in an integer for which it holds that a division of the trigger repetition frequency by the integer provides a repetition frequency of the control moments within this prescribed frequency range.

2. A method of synchronizing a power supply as claimed in claim 1, characterized in that the step of determining the integer is adapted to cause the integer to be equal to one for all trigger repetition frequencies within the prescribed frequency range.

3. A method of synchronizing a power supply as claimed in claim 2, characterized in that the step of determining the integer is adapted to generate the integer having a value causing the repetition frequency of the control signal to be as close as possible to a highest frequency within the prescribed frequency range but not being higher than the highest frequency, if the trigger repetition frequency is higher than the highest frequency.

4. A method of synchronizing a power supply as claimed in claim 3, characterized in that the step of determining the integer comprises the steps:
generating a disable period with a certain duration in response to the trigger signal; and
generating a control signal in response to the trigger signal if this trigger signal does not occur during a preceding disable period, wherein the certain duration corresponds to the highest frequency.

5. A display system comprising:
a picture display device for displaying picture information;
a multiple rate line addressing circuit for generating a line addressing of the picture display device having a line addressing repetition frequency, and for generating a trigger signal having a trigger repetition frequency equal to the line addressing repetition frequency;
a synchronized power supply for generating a supply voltage;
means for determining an integer larger than zero in dependence upon the trigger repetition frequency; and
means for generating a control signal for determining a switching frequency of the power supply in response to the trigger signal, the control signal having a repetition frequency which is equal to the trigger frequency divided by the integer, characterized in that the repetition frequency of the control signal is one of several values within a prescribed frequency range, and the means for determining the integer is adapted to generate the integer such that a division of the trigger repetition frequency by the integer provides a repetition frequency of the control signal within this prescribed frequency range.

6. A display system as claimed in claim 5, characterized in that the means for determining the integer comprises a non-retriggerable multivibrator having an input coupled to receive the trigger signal and an output coupled to supply the control signal, the trigger signal causing the multivibrator to change to a disable state having a certain duration if the trigger signal does not occur during a preceding disable state, and the output of the multivibrator staying in the disable state if the trigger signal occurs during this disable state.

7. A control circuit for synchronizing a power supply to a trigger signal having a trigger frequency equal to a line addressing repetition frequency of a line addressing circuit, the control circuit comprising:
means for determining an integer larger than zero in dependence upon the trigger frequency; and
means for generating a control signal for determining a switching frequency of the power supply in response to the trigger signal, the control signal having a repetition frequency which is equal to the trigger frequency divided by the integer, characterized in that the repetition frequency of the control signal is one of several values within a prescribed frequency range, and the means for determining the integer is adapted to generate the integer such that a division of the trigger repetition frequency by the integer provides a repetition frequency of the control signal within this prescribed frequency range.

8. A device for synchronizing a power supply to a line addressing repetition frequency of a line addressing circuit, the synchronizing device comprising:
means for generating trigger moments having a trigger repetition frequency equal to the line addressing repetition frequency;
means for determining an integer larger than zero in dependence upon the trigger repetition frequency; and
means for generating control moments in response to the trigger moments for determining a switching frequency of the power supply, the control moments having a repetition frequency which is equal to the trigger repetition frequency divided by the integer, characterized in that the repetition frequency of the control moments is one of several values within a prescribed frequency range, and the means for determining the integer determines the integer such that a division of the trigger repetition frequency by the integer provides a repetition frequency of the control moments within this prescribed frequency range.

9. A device for synchronizing a power supply as claimed in claim 8, characterized in that the means for determining the integer is adapted to cause the integer to be equal to one for all trigger repetition frequencies within the prescribed frequency range.

10. A device for synchronizing a power supply as claimed in claim 9, characterized in that the means for determining the integer is adapted to generate the integer such that the repetition frequency of the control signal is as close as possible to a highest frequency within the prescribed frequency range but not being higher than the highest frequency, if the trigger repetition frequency is higher than the highest frequency.

11. A device for synchronizing a power supply as claimed in claim 10, characterized in that the means for determining the integer comprises:
means for generating a disable period with a certain duration in response to the trigger signal, and for generating a control signal in response to the trigger signal if this trigger signal does not occur during a preceding disable period, wherein the certain duration corresponds to the highest frequency.

* * * * *